US008582467B2

(12) United States Patent  
Hirota et al.

(10) Patent No.: US 8,582,467 B2
(45) Date of Patent: Nov. 12, 2013

(54) METHOD FOR PREVENTING CONTROL PACKET LOOPING AND BRIDGE APPARATUS USING THE METHOD

(75) Inventors: Masaki Hirota, Kawasaki (JP); Kazuto Nishimura, Kawasaki (JP); Yasushi Sasakawa, Kawasaki (JP); Kou Takatori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1232 days.

(21) Appl. No.: 11/023,916

(22) Filed: Dec. 28, 2004

(65) Prior Publication Data

US 2006/0007869 A1 Jan. 12, 2006

(30) Foreign Application Priority Data

Jul. 9, 2004 (JP) ................................ 2004-203674

(51) Int. Cl.
H04L 12/28 (2006.01)
H04L 12/56 (2011.01)
G06F 15/173 (2006.01)
G06F 15/16 (2006.01)

(52) U.S. Cl.
USPC ........... 370/254; 370/352; 370/389; 370/392; 370/401; 709/235; 709/238; 709/245

(58) Field of Classification Search
USPC .......... 370/389, 401, 216–256; 709/235, 238, 709/245
See application file for complete search history.

(56) References Cited

U.S. PATENT DOCUMENTS

| 5,150,360 | A | * | 9/1992 | Perlman et al. | 370/402 |
|---|---|---|---|---|---|
| 5,260,945 | A | * | 11/1993 | Rodeheffer | 714/4 |
| 5,331,637 | A | * | 7/1994 | Francis et al. | 370/408 |
| 5,394,436 | A | * | 2/1995 | Meier et al. | 375/132 |
| 5,734,824 | A | * | 3/1998 | Choi | 709/224 |
| 5,805,805 | A | * | 9/1998 | Civanlar et al. | 709/220 |
| 5,818,842 | A | * | 10/1998 | Burwell et al. | 370/397 |
| 6,032,194 | A | * | 2/2000 | Gai et al. | 709/239 |
| 6,115,378 | A | * | 9/2000 | Hendel et al. | 370/392 |
| 6,262,977 | B1 | * | 7/2001 | Seaman et al. | 370/256 |
| 6,330,229 | B1 | * | 12/2001 | Jain et al. | 370/256 |
| 6,374,311 | B1 | * | 4/2002 | Mahany et al. | 710/18 |
| 6,388,995 | B1 | * | 5/2002 | Gai et al. | 370/256 |
| 6,456,597 | B1 | * | 9/2002 | Bare | 370/252 |
| 6,473,403 | B1 | * | 10/2002 | Bare | 370/236 |
| 6,493,318 | B1 | * | 12/2002 | Bare | 370/238 |
| 6,515,969 | B1 | * | 2/2003 | Smith | 370/256 |
| 6,519,213 | B1 | * | 2/2003 | Song et al. | 369/44.26 |
| 6,535,490 | B1 | * | 3/2003 | Jain | 370/256 |
| 6,535,491 | B2 | * | 3/2003 | Gai et al. | 370/256 |
| 6,556,541 | B1 | * | 4/2003 | Bare | 370/235 |
| 6,577,600 | B1 | * | 6/2003 | Bare | 370/238 |

(Continued)

FOREIGN PATENT DOCUMENTS

JP 11-168491 6/1999

*Primary Examiner* — Phirin Sam
*Assistant Examiner* — Venkatesh Haliyur
(74) *Attorney, Agent, or Firm* — Fujitsu Patent Center

(57) ABSTRACT

A method for preventing a control packet loop in a network realizing node redundancy or circuit redundancy based on a rapid spanning tree protocol or a multiple spanning tree protocol is disclosed. The method includes the steps of: detecting a loop of a control packet of the rapid spanning tree protocol or the multiple spanning tree protocol; and discarding the control packet by which the loop is detected so as to prevent occurrence of the loop of the control packet.

2 Claims, 18 Drawing Sheets

| BYTE | EACH FIELD |
|---|---|
| 2 | PROTOCOL ID |
| 1 | VERSION |
| 1 | MESSAGE TYPE |
| 1 | FLAGS |
| 2 | ROOT BRIDGE PRIORITY |
| 6 | ROOT BRIDGE ID |
| 4 | PATH COST |
| 2 | BRIDGE PRIORITY |
| 6 | BRIDGE ID |
| 1 | PORT PRIORITY |
| 1 | PORT ID |
| 2 | MESSAGE AGE |
| 2 | MAX AGE |
| 2 | HELLO TIME |
| 2 | FORWARD DELAY |
| 1 | VERSION 1 LENGTH |

| | |
|---|---|
| BIT POSITION 0 | TOPOLOGY CHANGE FLAG |
| BIT POSITION 1 | PROPOSAL FLAG |
| BIT POSITION 2-3 | FUNCTION OF PORT |
| | 00 UNKNOWN PORT |
| | 01 ALTERNATE OR BACKUP PORT |
| | 10 ROOT PORT |
| | 11 DESIGNATED PORT |
| BIT POSITION 4 | LEARNING FLAG |
| BIT POSITION 5 | FORWARDING FLAG |
| BIT POSITION 6 | AGREEMENT FLAG |
| BIT POSITION 7 | ACK FLAG OF TOPOLOGY CHANGE |

(56) References Cited

U.S. PATENT DOCUMENTS

| | | | |
|---|---|---|---|
| 6,580,715 B1* | 6/2003 | Bare | 370/396 |
| 6,584,080 B1* | 6/2003 | Ganz et al. | 370/315 |
| 6,611,502 B1* | 8/2003 | Seaman | 370/256 |
| 6,628,624 B1* | 9/2003 | Mahajan et al. | 370/256 |
| 6,650,646 B1* | 11/2003 | Galway et al. | 370/397 |
| 6,680,917 B1* | 1/2004 | Seaman | 370/256 |
| 6,697,339 B1* | 2/2004 | Jain | 370/256 |
| 6,717,922 B2* | 4/2004 | Hsu et al. | 370/258 |
| 6,865,160 B1* | 3/2005 | Bare | 370/256 |
| 6,882,630 B1* | 4/2005 | Seaman | 370/256 |
| 6,937,576 B1* | 8/2005 | Di Benedetto et al. | 370/256 |
| 6,947,384 B2* | 9/2005 | Bare | 370/235 |
| 6,963,575 B1* | 11/2005 | Sistanizadeh et al. | 370/404 |
| 6,976,088 B1* | 12/2005 | Gai et al. | 709/238 |
| 7,016,336 B2* | 3/2006 | Sorensen | 370/351 |
| 7,020,139 B2* | 3/2006 | Kalkunte et al. | 370/392 |
| 7,061,875 B1* | 6/2006 | Portolani et al. | 370/256 |
| 7,061,876 B2* | 6/2006 | Ambe | 370/256 |
| 7,089,335 B2* | 8/2006 | Aiken et al. | 709/250 |
| 7,103,008 B2* | 9/2006 | Greenblat et al. | 370/258 |
| 7,154,861 B1* | 12/2006 | Merchant et al. | 370/254 |
| 7,209,435 B1* | 4/2007 | Kuo et al. | 370/219 |
| 7,283,476 B2* | 10/2007 | Bare | 370/236 |
| 7,292,581 B2* | 11/2007 | Finn | 370/395.53 |
| 7,301,912 B2* | 11/2007 | Hong et al. | 370/256 |
| 7,327,688 B2* | 2/2008 | Burwell et al. | 370/242 |
| 7,330,440 B1* | 2/2008 | Bryant et al. | 370/254 |
| 7,362,709 B1* | 4/2008 | Hui et al. | 370/237 |
| 7,408,883 B2* | 8/2008 | Deragon et al. | 370/249 |
| 7,430,164 B2* | 9/2008 | Bare | 370/217 |
| 7,480,258 B1* | 1/2009 | Shuen et al. | 370/256 |
| 7,558,205 B1* | 7/2009 | Moncada-Elias et al. | 370/236 |
| 7,564,858 B1* | 7/2009 | Moncada-Elias et al. | 370/402 |
| 7,577,106 B1* | 8/2009 | Shand et al. | 370/254 |
| 7,586,856 B1* | 9/2009 | Thottakkara et al. | 370/256 |
| 7,596,101 B2* | 9/2009 | Oguchi | 370/256 |
| 7,706,364 B2* | 4/2010 | Smith et al. | 370/389 |
| 7,710,957 B2* | 5/2010 | Smith | 370/389 |
| 7,852,772 B2* | 12/2010 | Filsfils et al. | 370/238 |
| 7,855,953 B2* | 12/2010 | Filsfils et al. | 370/228 |
| 7,864,669 B2* | 1/2011 | Bonaventure et al. | 370/225 |
| 7,872,992 B2* | 1/2011 | Ukita et al. | 370/256 |
| 7,877,483 B1* | 1/2011 | Finn | 709/227 |
| 8,462,668 B2* | 6/2013 | Kuo et al. | 370/255 |
| 2002/0023170 A1* | 2/2002 | Seaman et al. | 709/235 |
| 2002/0052936 A1* | 5/2002 | Gai et al. | 709/220 |
| 2002/0147800 A1* | 10/2002 | Gai et al. | 709/221 |
| 2003/0016624 A1* | 1/2003 | Bare | 370/217 |
| 2003/0026268 A1* | 2/2003 | Navas | 370/400 |
| 2003/0142680 A1* | 7/2003 | Oguchi | 370/400 |
| 2003/0142685 A1* | 7/2003 | Bare | 370/410 |
| 2003/0165119 A1* | 9/2003 | Hsu et al. | 370/258 |
| 2003/0172257 A1* | 9/2003 | Greenblat et al. | 712/234 |
| 2003/0179707 A1* | 9/2003 | Bare | 370/235 |
| 2003/0189940 A1* | 10/2003 | Greenblat | 370/406 |
| 2003/0191862 A1* | 10/2003 | Greenblat | 709/251 |
| 2003/0195989 A1* | 10/2003 | Greenblat | 709/251 |
| 2003/0195990 A1* | 10/2003 | Greenblat | 709/251 |
| 2003/0195991 A1* | 10/2003 | Masel et al. | 709/251 |
| 2003/0200342 A1* | 10/2003 | Greenblat et al. | 709/251 |
| 2003/0200343 A1* | 10/2003 | Greenblat et al. | 709/251 |
| 2003/0204636 A1* | 10/2003 | Greenblat et al. | 709/251 |
| 2003/0208618 A1* | 11/2003 | Mor et al. | 709/238 |
| 2004/0090926 A1* | 5/2004 | Hong et al. | 370/254 |
| 2004/0105455 A1* | 6/2004 | Seaman | 370/423 |
| 2004/0131064 A1* | 7/2004 | Burwell et al. | 370/397 |
| 2004/0179524 A1* | 9/2004 | Sasagawa et al. | 370/389 |
| 2004/0223503 A1* | 11/2004 | Lynch et al. | 370/404 |
| 2004/0252634 A1* | 12/2004 | Regan et al. | 370/216 |
| 2005/0076140 A1* | 4/2005 | Fung | 709/245 |
| 2005/0249123 A1* | 11/2005 | Finn | 370/242 |
| 2005/0259646 A1* | 11/2005 | Smith et al. | 370/389 |
| 2005/0259649 A1* | 11/2005 | Smith | 370/389 |
| 2006/0007869 A1* | 1/2006 | Hirota et al. | 370/244 |
| 2006/0013141 A1* | 1/2006 | Mutoh et al. | 370/241 |
| 2006/0013210 A1* | 1/2006 | Bordogna et al. | 370/389 |
| 2006/0045021 A1* | 3/2006 | Deragon et al. | 370/249 |
| 2007/0091793 A1* | 4/2007 | Filsfils et al. | 370/228 |
| 2007/0091794 A1* | 4/2007 | Filsfils et al. | 370/228 |
| 2007/0091795 A1* | 4/2007 | Bonaventure et al. | 370/228 |
| 2007/0091796 A1* | 4/2007 | Filsfils et al. | 370/228 |
| 2008/0002669 A1* | 1/2008 | O'Brien et al. | 370/352 |
| 2009/0238196 A1* | 9/2009 | Ukita et al. | 370/408 |
| 2009/0274153 A1* | 11/2009 | Kuo et al. | 370/392 |
| 2011/0145433 A1* | 6/2011 | Noel et al. | 709/232 |

* cited by examiner

METHOD FOR PREVENTING CONTROL PACKET LOOPING AND BRIDGE APPARATUS USING THE METHOD

BACKGROUND OF THE INVENTION

1. Field of the Invention

The present invention relates to a control packet loop prevention method and a bridge apparatus using the method. More particularly, the present invention relates to a control packet loop prevention method and a bridge apparatus using the method in a network in which node redundancy or circuit redundancy is realized by using RSTP (Rapid Spanning Tree Protocol) or MSTP (Multiple Spanning Tree Protocol).

2. Description of the Related Art

The RSTP (Rapid Spanning Tree Protocol) that is standardized in IEEE 802.1w/1y is a protocol for realizing node redundancy or circuit redundancy in a network using layer 2 switches.

The RSTP is known as a protocol for logically establishing a tee having no loop by using parameters such as bridge priorities and the like that are set in bridges (layer 2 switches). In RSTP, a topology of a network can be switched to a new topology within several seconds when a topology change occurs due to parameter change or due to line failure or the like.

FIG. 1A shows an example of a network configuration. In the network, bridges #1-#4 that are layer 2 switches are connected with each other. In the figure, a root bridge is a bridge having a strongest (smallest) bridge priority. A root bridge exists in a tree and the tree is formed centering the root bridge. In the figure, the bridge 1 is the root bridge. Each of the bridges #1-#4 has the priority value of the root bridge.

Among the bridges #1-#4, a BPDU (Bridge Protocol Data Unit that is control packet for RSTP) including items shown in FIG. 2 is sent and received so that each bridge is notified of a strength of each bridge or ports of the bridge, parameters for STP for determining operation conditions of RSTP such as a hallo time. In addition, each bridge is notified of an after-mentioned message age. Accordingly, information of the root bridge is transferred from the root bridge to each branch (end of tree).

As a port in a bridge, there are three types of ports: a designated port (shows as a black circle in figures), a root port (white circle) and an alternate port (2 lines). The designated port is a port extending from the root bridge side to an end side of a tree. The root port is connected to the designated port and receives a main signal and the BPDU. The alternate port is connected to the designated port, and the alternate port blocks the main signal but receives the BPDU.

The message age in the BPDU shown in FIG. 2 indicates a term of validity of the BPDU. Each time when the message age is transferred by a bridge, a larger value between 1 and an integer part of (max edges)/16 is added to the message age. A BPDU having a message age equal to or larger than the max age is invalid so that the BPDU is discarded. A path cost is a value used for weighting a route via which the BPDU is transferred. Each time when the BPDU is received, a value assigned to an input port is added to the path cost. The smaller the path cost is, the more favorable the route is. The hello time indicates a time interval at which the BPDU is transmitted. A default value of the hello time is 2 seconds.

In the RSTP, a tree that does not have any loop as shown in FIG. 1B is constituted by exchanging strength information and the like of bridge/port by using the BPDU among bridges. Then, as shown in FIG. 3A, when a failure occurs between bridges #1 and #3 or when a parameter is changed, a new tree as shown in FIG. 3B is formed.

Japanese Laid Open Patent Application 11-168491 discloses a system having a counter for counting a number of relay frames in which the counter is cleared each time when a BPDU frame is receives, and when the value of the counter becomes larger than a predetermined value, it is judged that a loop occurs so that frame relaying is stopped.

In a network in which four bridges #1-#4 are connected, assuming that the bridge priority of the bridge #1 that is the route bridge is changed from "4096" to "20480". In this case, strength relationships to other bridges #2-#4 are changed so that a topology change occurs. In the figure, "RBID" indicates a root bridge ID in the BPDU, and MA indicates a message age. The root bridge ID includes the bridge priority of the root bridge and MAC address #1 of the root bridge.

In this case, the bridges #2 and #3 age out (discard) the bridge priority (=4096) of the bridge #1 at the same time, and each bridge updates bridge priority of a root bridge by using a received BPDU, so that a new RSTP tree shown in FIG. 5B is established after a few second.

However, as a matter of fact, the timing at which the aging out of the bridge priority of the bridge #1 is performed is different between the bridges #2 and #3. Thus, there is a possibility that a BPDU is transmitted among the bridges #2-#4 as if the bridge priority of the bridge #1 remains 4096.

That is, right after the bridge #2 ages out the information, the bridge #2 insists that the bridge #2 itself is the root bridge (2). However, since the bridge #3 has not aged out, the bridge #3 transmits the former bridge priority=4096 of the bridge #1 to the bridge #2 (3). The bridge #2 transfers the bridge priority to a neighboring bridge (4).

Thus, the priority is transferred to the bridges #3, #2, #4 and then #3. At this time, as shown in FIG. 5A, if the bridge #3 ages out the bridge priority of the root bridge, the bridge #3 further transfers the bridge priority=4096, so that the priority is transferred to the bridges #2, #4, #3, #2 and #4 in this order. As a result, a loop is formed among the bridges #2, #3 and #4.

The looping BPDU continues to exist as long as the message age value in the BPDU is equal to or smaller than the max age value. Thus, for example, since a default max age is 20, the looping BPDU continues to exist while the BPDU is being transferred through 20 bridges at the maximum. That is, the looping BPDU exists for more than 10 seconds.

The above-mentioned explanation is based on a case where there is one loop for the sake of simplicity. If there are a plurality of loops, the above-mentioned operations are intertwined with each other, so that there is a possibility that it may take several minutes at the maximum until the looping BPDU disappears after a bridge priority change is performed. For example, also in the case shown in FIGS. 4A-4B and 5A-4B, there is a possibility that a loop may occur in bridges #1, #2 and #3 and in bridges #1, #2, #3 and #4. Thus, there is a problem in that it takes a long time to switch a tree.

In this case, since a new RSTP tree is constructed after the BPDU having the bridge priority 4096 of the bridge #1 disappears, it may take several minutes at the maximum to generate a new tree. Off course, the main signal is disconnected for the same time interval as the tree reconstructing time.

This phenomenon may occur not only when the bridge priority is changed but also when a node failure (failure of BPDU sending function and the like) in the root bridge #1 occurs. In addition, this phenomenon may occur for MSTP defined in IEEE802.1s in the same way.

SUMMARY OF THE INVENTION

An object of the present invention is to provide a control packet loop prevention method and a bridge apparatus using the method for preventing a loop of the control packet so as to decrease the time for switching a tree, decrease the disconnected time of the main signal and prevent a loop of the main signal.

The above-object is achieved by a method for preventing a control packet loop in a network realizing node redundancy or circuit redundancy based on a rapid spanning tree protocol or a multiple spanning tree protocol, the method including the steps of:

detecting a loop of a control packet of the rapid spanning tree protocol or the multiple spanning tree protocol; and discarding the control packet by which the loop is detected so as to prevent occurrence of the loop of the control packet.

The above-object is also achieved by a bridge apparatus for preventing a control packet loop in a network realizing node redundancy or circuit redundancy based on a rapid spanning tree protocol or a multiple spanning tree protocol, the method including the steps of:

a loop detection part for detecting a loop of a control packet of the rapid spanning tree protocol or the multiple spanning tree protocol; and a control loop discarding part for discarding the control packet by which the loop is detected.

The bridge apparatus may be connected to a root bridge, and the control message is received after the bridge apparatus ages out information of the root bridge, wherein, the loop detection part detects the loop of the control packet on condition that a root bridge priority and a root bridge address included in the control packet are the same as a priority and an address of the root bridge and that a message age in the control packet is not 0.

In the bridge apparatus, when a priority of the bridge apparatus that is a root bridge is changed, the loop detection part detects the loop of the control packet on condition that a root bridge address included in the control packet is the same as an address of the bridge apparatus and that a root bridge priority included in the control packet is different from the changed priority of the bridge apparatus.

In the bridge apparatus, the loop detection part may detect the loop by using the control packet that is received within a predetermined time period after aging out the information.

According to the present invention, occurrence of a loop of the control packet can be prevented so that the time for switching a tree and the disconnecting time of the main signal can be decreased. In addition, a loop of the main signal can be prevented.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention are described.

In the present invention, a received BPDU that causes a BPDU loop is detected. Then, the BPDU that may cause a loop is discarded to prevent the BPDU from being transferred to other bridge. Accordingly, any BPDU loop does not occur and reconstruction of a tree can be performed for several seconds.

More specifically, a bridge connected to a root bridge determines that a BPDU loop occurs if a root bridge ID (bridge priority of a root bridge and the MAC address of a root bridge) in a BPDU received after aging out is the same as a root bridge ID before aging out and if the message age is not 0. Then, the received BPDU is discarded.

Since a root bridge transmits a BPDU with message age=0, it can be determined that a root bridge other than a former root bridge (root bridge before topology change) transfers the BPDU if the message age is not 0.

Figure 1B:
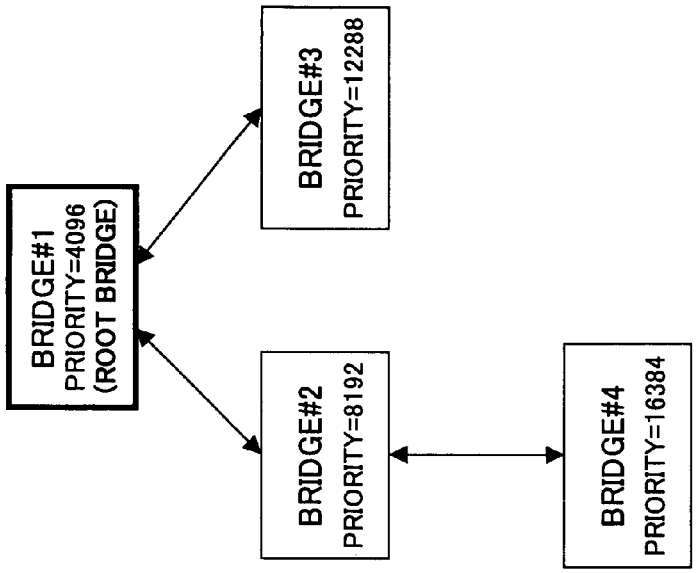
FIGS. 1A and 1B are figures for explaining a network configuration and generation of a tree by using RSTP.
Figure 1A:
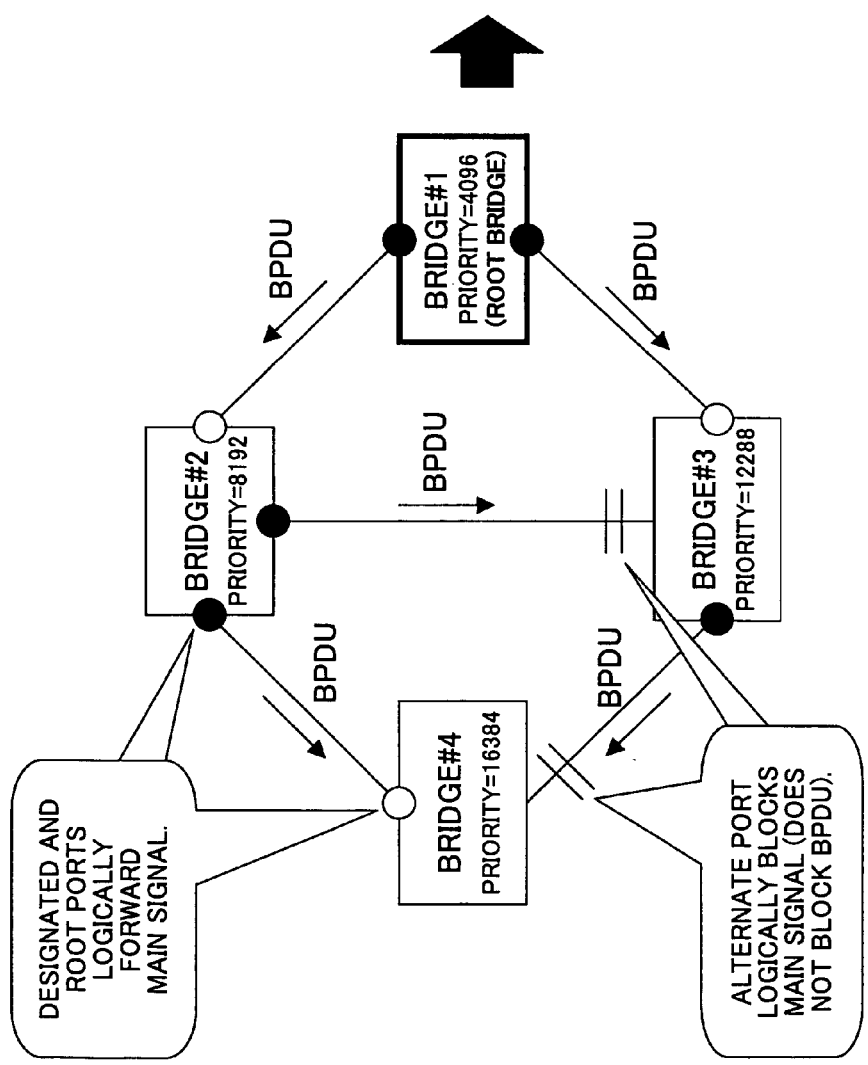
Figure 2:
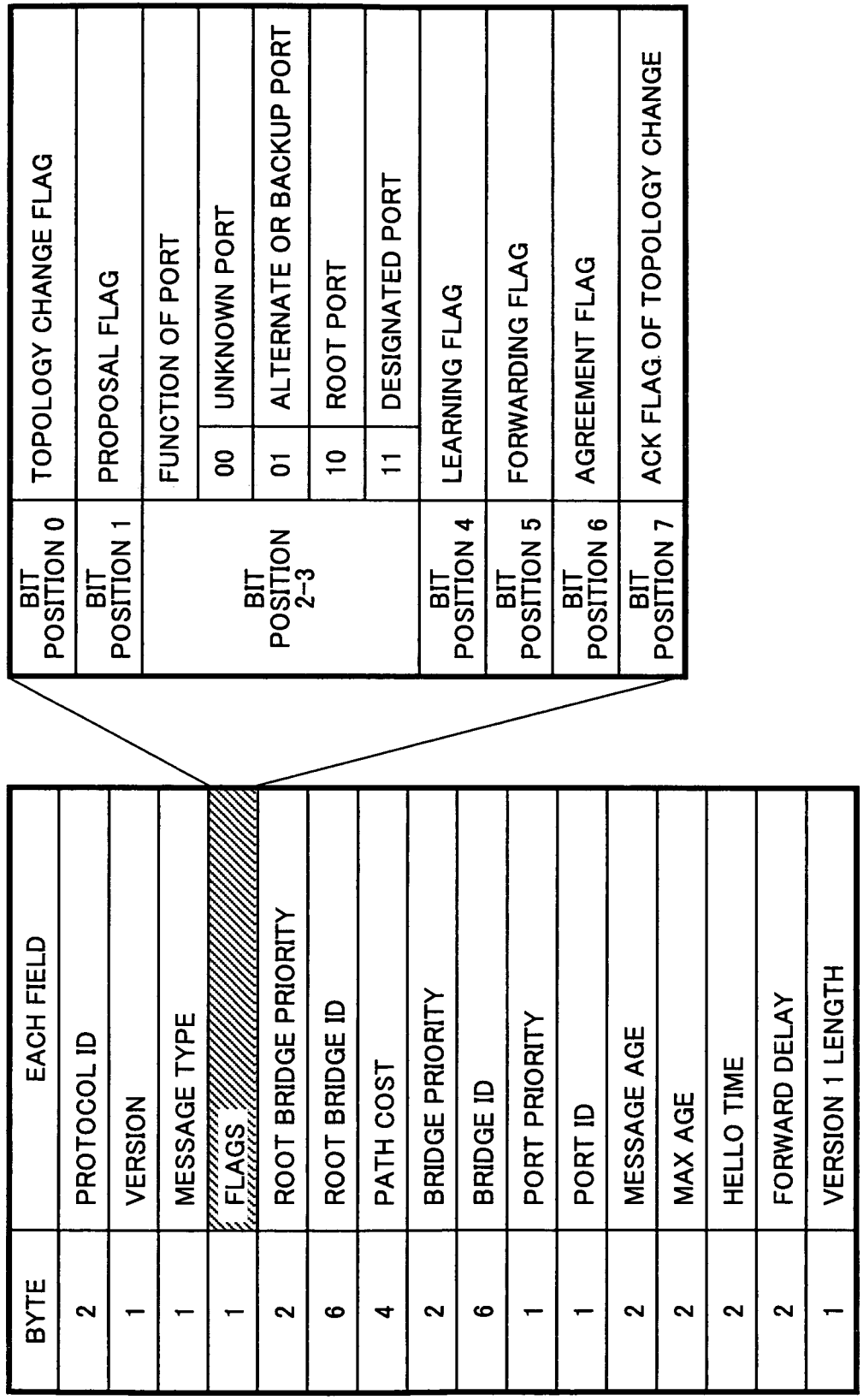
FIG. 2 is a figure for explaining BPDU.
Figure 3B:
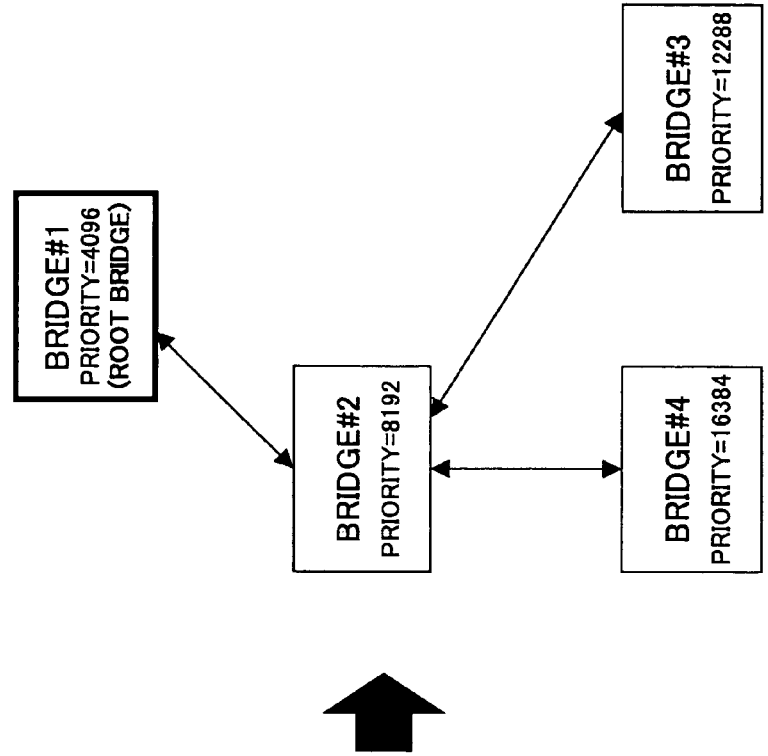
FIGS. 3A and 3B are figures for explaining a network configuration and generation of a tree by using RSTP in an event of a failure.
Figure 3A:
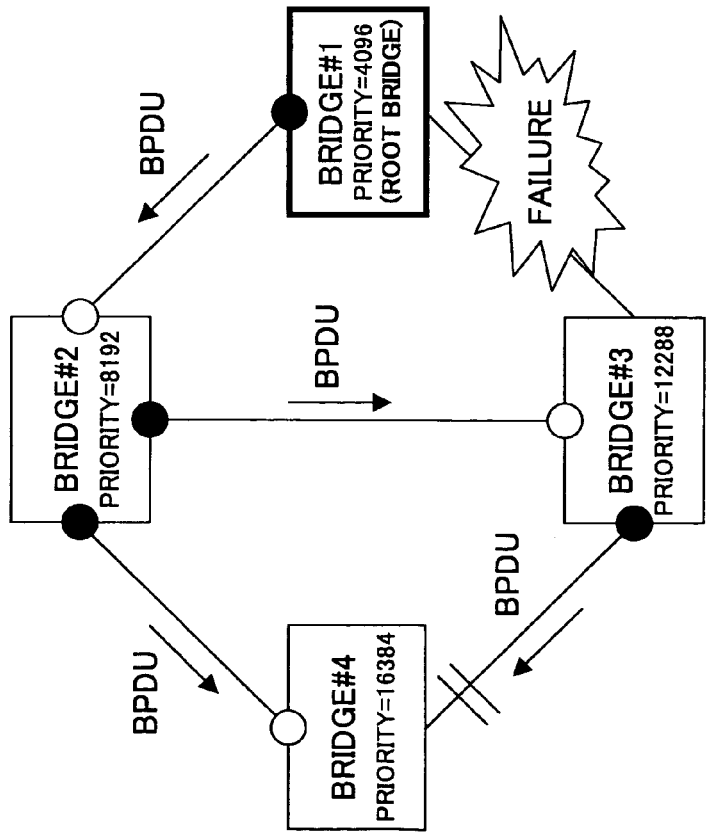
Figure 4A:
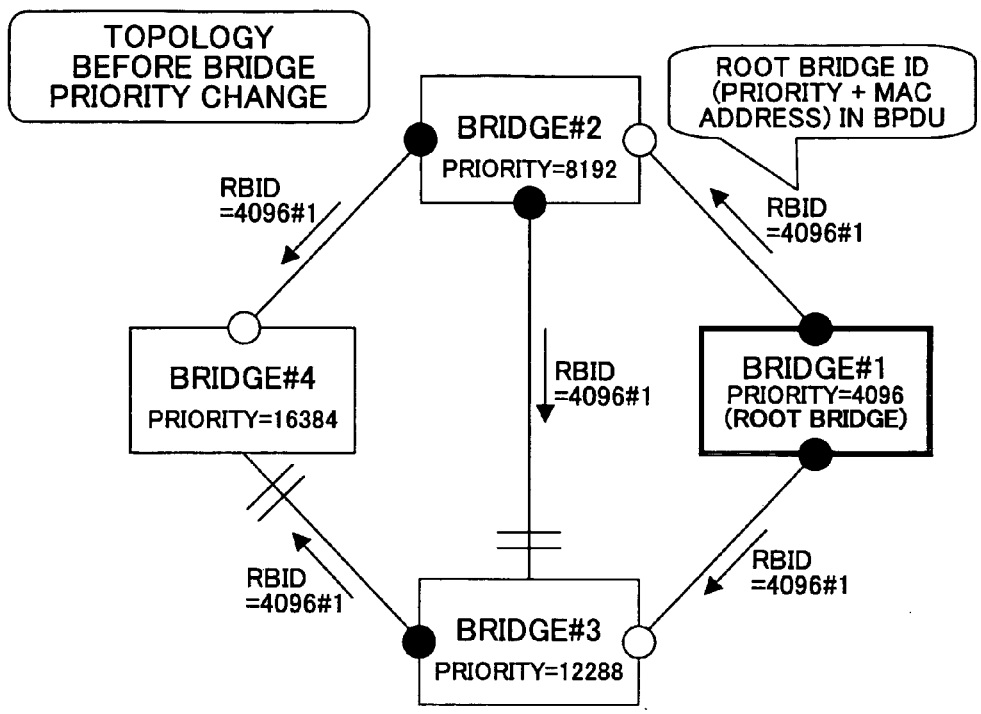
FIGS. 4A and 4B show change of network states when a topology change occurs in a conventional technology.
Figure 4B:
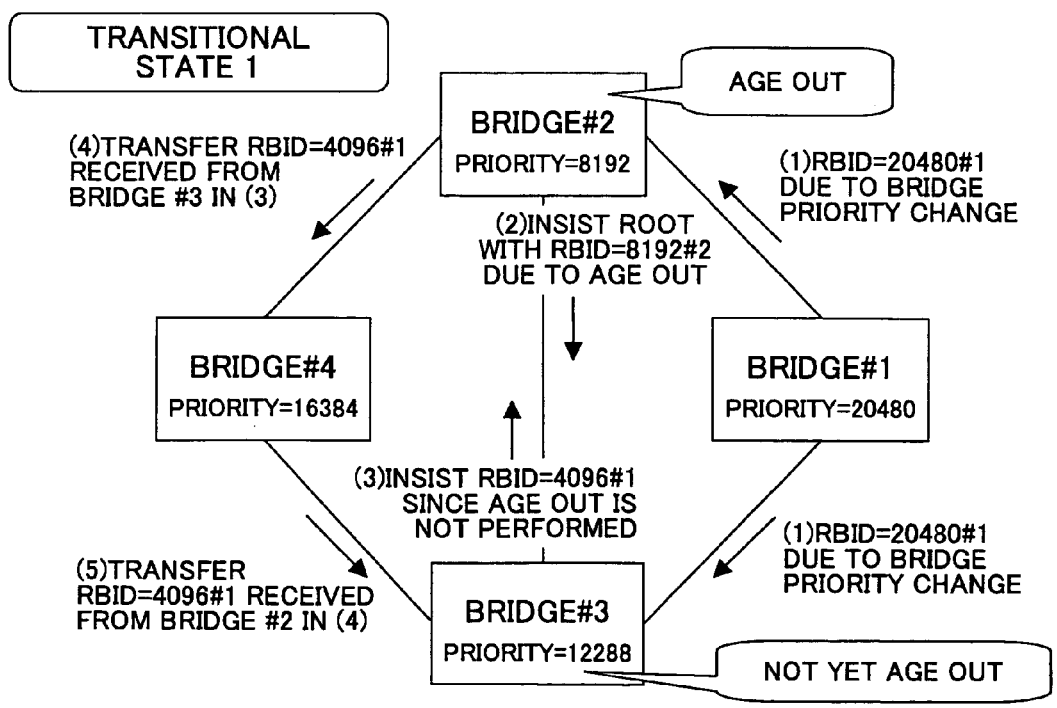
Figure 5A:
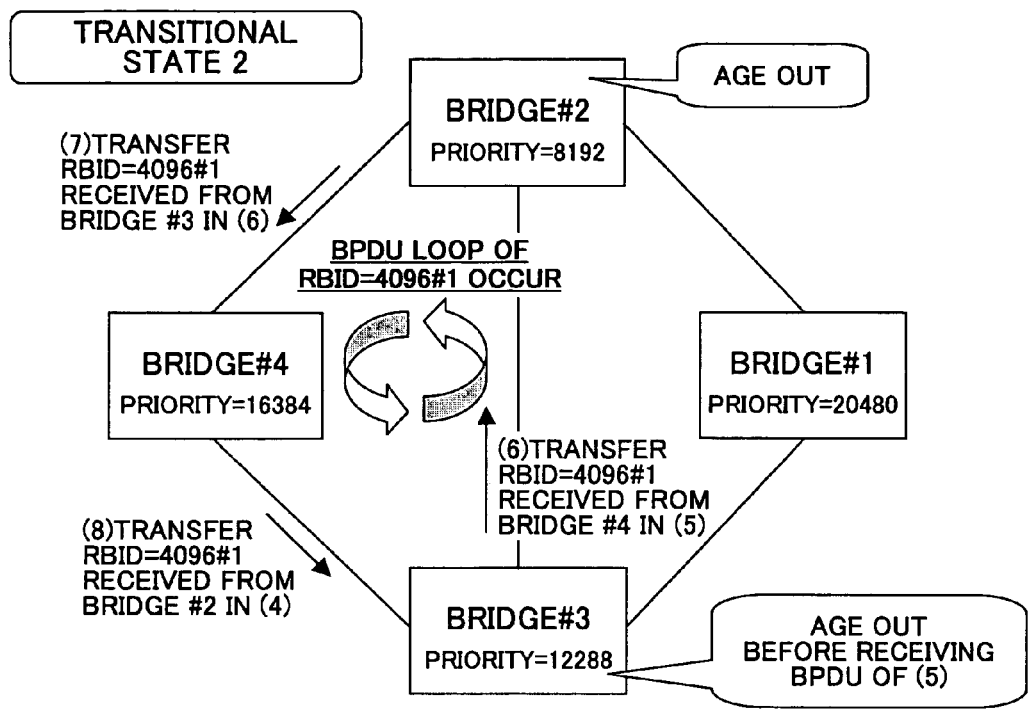
FIGS. 5A and 5B show change of network states when a topology change occurs in a conventional technology.
Figure 5B:
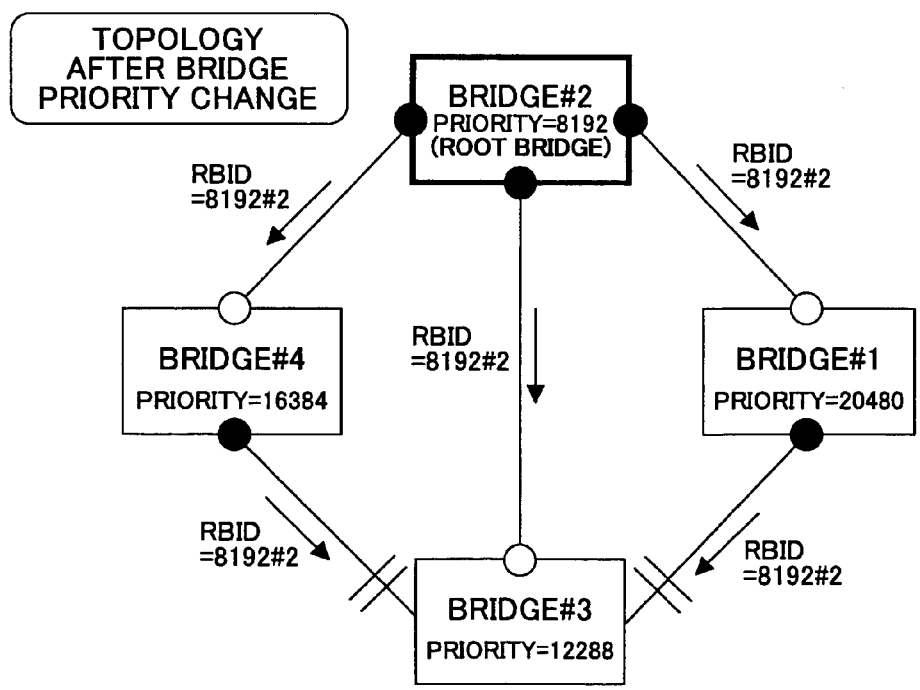
Figure 6A:
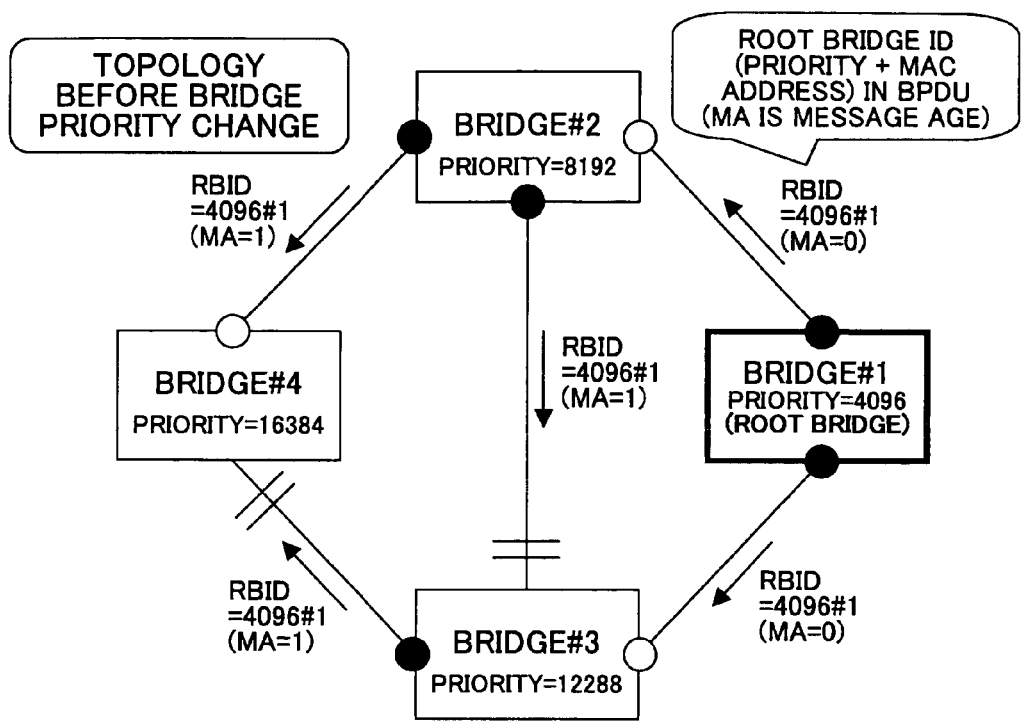
FIGS. 6A and 6B show change of network states when a topology change occurs according to the present invention.

In a network in which four bridges (layer 2 switches) #1-#4 are connected as shown in FIG. 6A, it is assumed that a bridge priority of the bridge #1 that is a root bridge is changed from 4096 to 20480 so that a topology change (tree reconstruction) occurs.

In the figure, RBID indicates a root bridge ID in a BPDU, and MA indicates a message age. The root bridge ID includes a bridge priority (4096 and the like) of a root bridge and a MAC address (#1 and the like) of the root bridge.

Figure 6B:
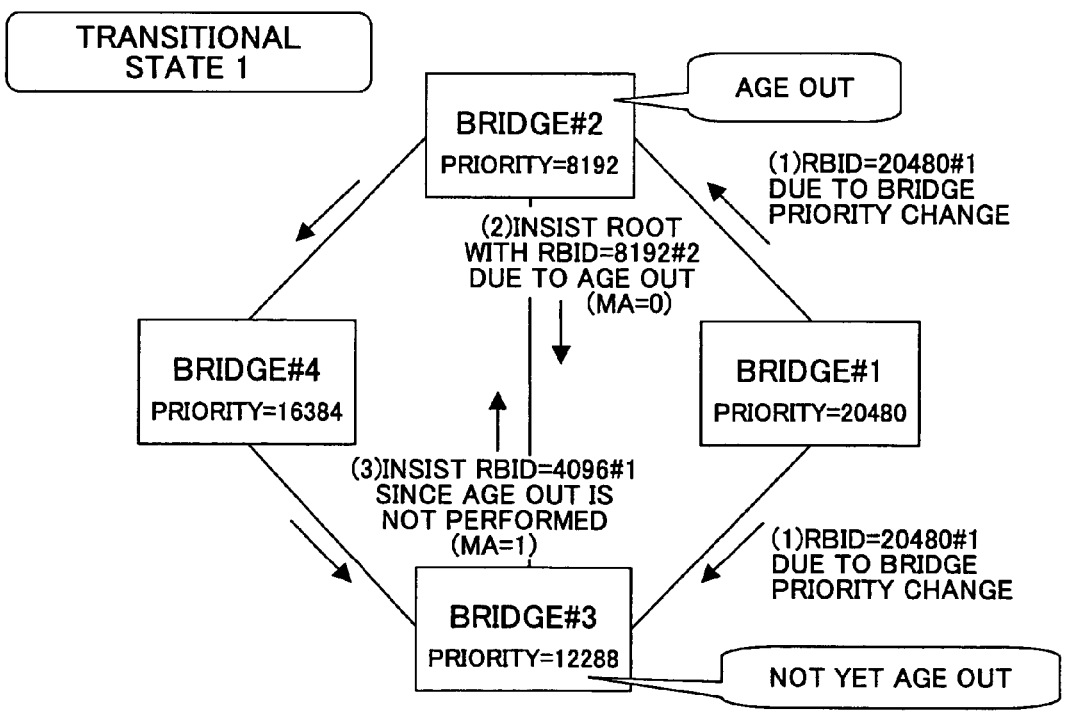

Right after the bridge #2 ages out, as shown in FIG. 6B, the bridge #2 insists that the bridge #2 itself is a root bridge (2). However, since the bridge #3 has not aged out, the bridge #3 transmits the former bridge priority 4096 of the bridge #1 to the bridge #2 (3).

In each bridge, if a bridge priority of a received BPDU is smaller than a bridge priority of a root bridge stored in the own bridge, the bridge immediately ages out the information. However, if the bridge priority of a received BPDU is larger than a bridge priority of a root bridge stored in the own bridge, the bridge waits for a time three times larger than the hello time before aging out. In the meantime of the waiting, the bridge is waiting for receiving a BPDU having a smaller bridge priority that that stored in the own bridge as a bridge priority of a root bridge. The timing for aging out is different among bridges due to difference of BPDU sending timing in each port in the root bridge and due to error in timers in the bridges that detect aging out.

The bridge #2 that receives the BPDU transmitted in (3) determines that a BPDU loop occurs since it is not normal to receive the BPDU with the root bridge ID=4096#1 and message age≠0 after aging out the former root bridge priority. Then, the bridge #2 discards the BPDU.

Figure 7:
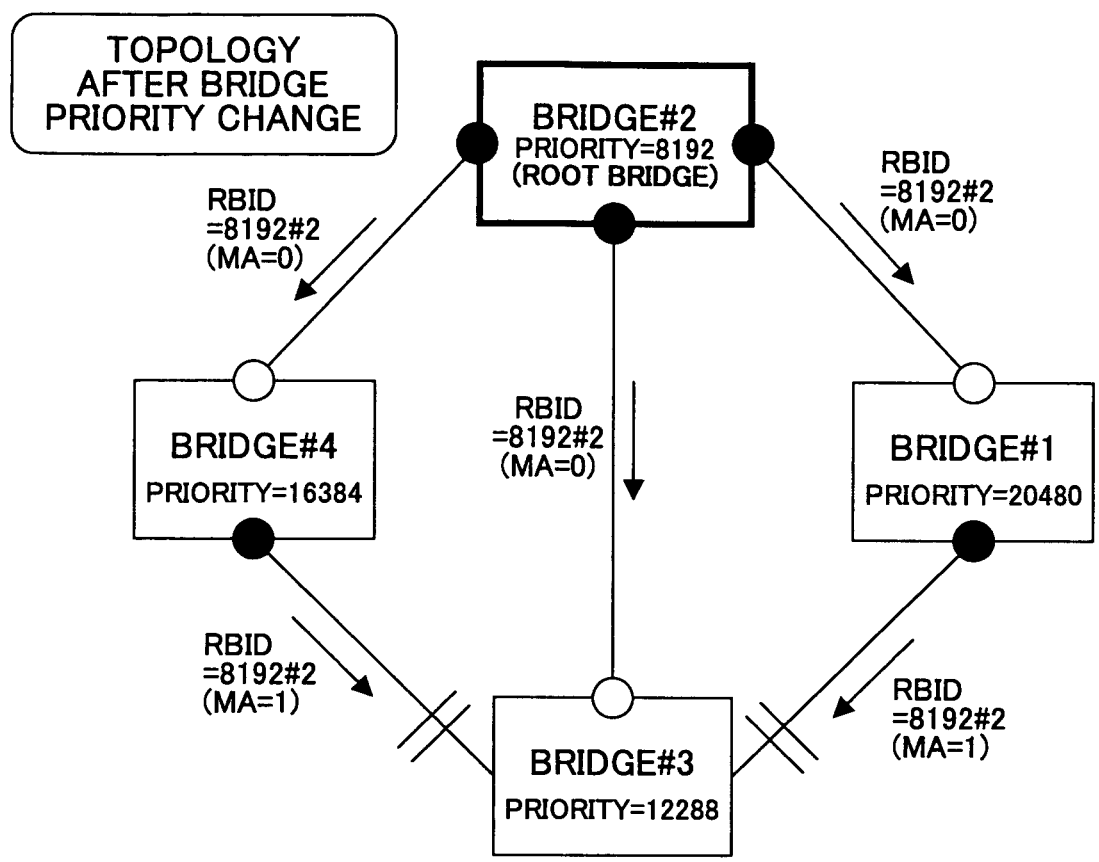
FIG. 7 shows change of network states when a topology change occurs according to the present invention.

Accordingly, it becomes possible to prevent a BPDU loop from continuing and enlarging. As a result, it becomes possible to construct a new tree by using STP parameters in each bridge for several seconds. That is, the state changes from FIG. 6B to FIG. 7 in which the bridge #2 becomes a root bridge.

Figure 8:
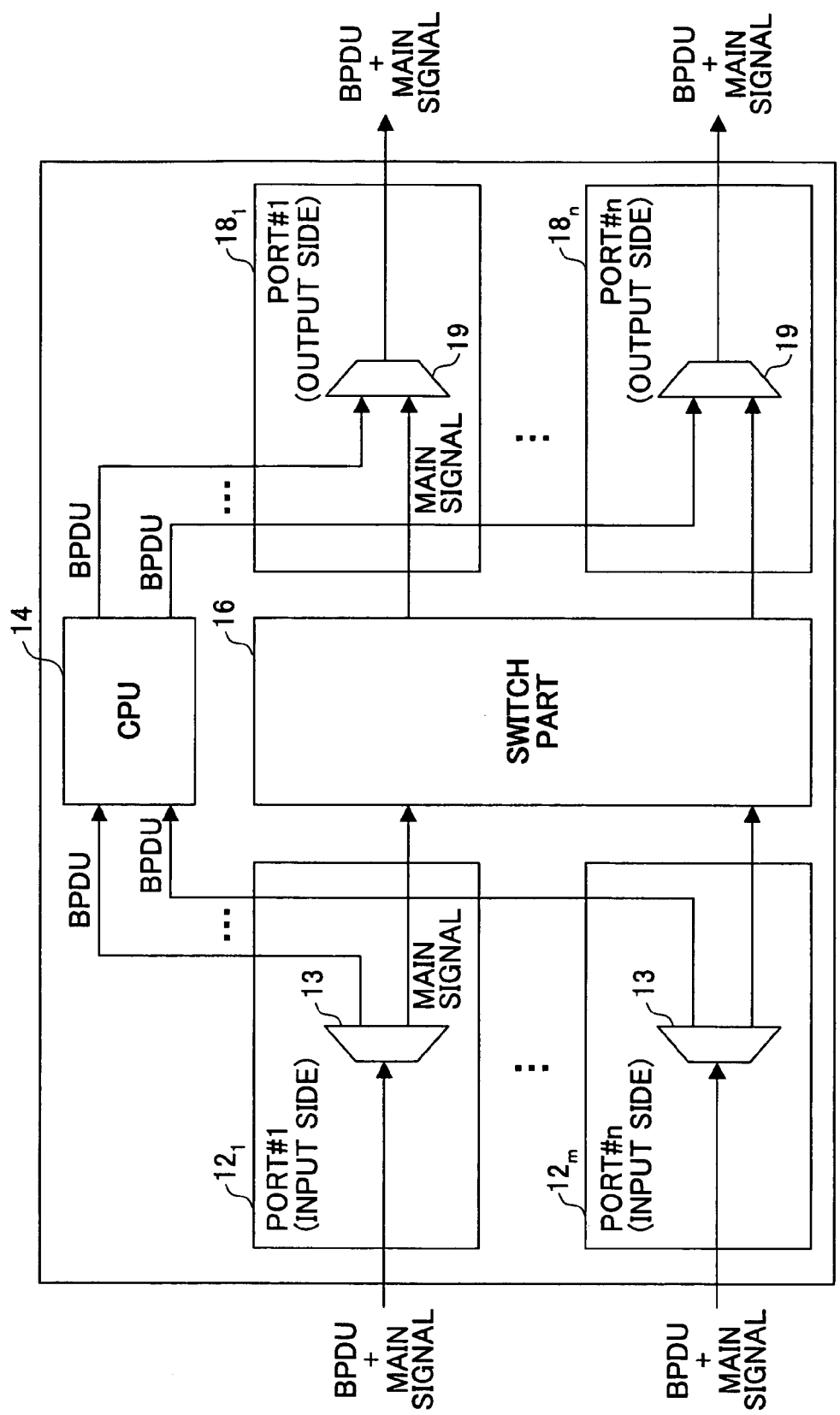
FIG. 8 is a block diagram of an embodiment of a bridge apparatus of the present invention.

FIG. 8 shows a block diagram of an embodiment of a bridge apparatus (layer 2 switch) of the present invention. In the figure, each of input port circuits $12_1$~$12_m$ receives a main signal including a BPDU. A BPDU extraction part 13 in each input port circuit extracts the BPDU from the received signal and provides the BPDU to the CPU 14, and provides the main signal to a switch part 16.

The CPU 14 receives a BPDU from each of the input port circuits $12_1$~$12_m$ so as to perform RSTP processing. A new BPDU generated in the CPU 14 is provided to an output port circuit in output port circuits $18_1$~$18_n$. The switch part 16 receives the main signal from each of the input port circuits $12_1$~$12_m$ and performs switching processes. Switched main signals are provided to each of the output port circuits $18_1$~$18_n$. A BPDU inserting part 19 in each of the output port circuits $18_1$~$18_n$ inserts the BPDU sent from the CPU 14 into the main signal sent from the switch part 16, and outputs the main signal over the network.

Figure 9:
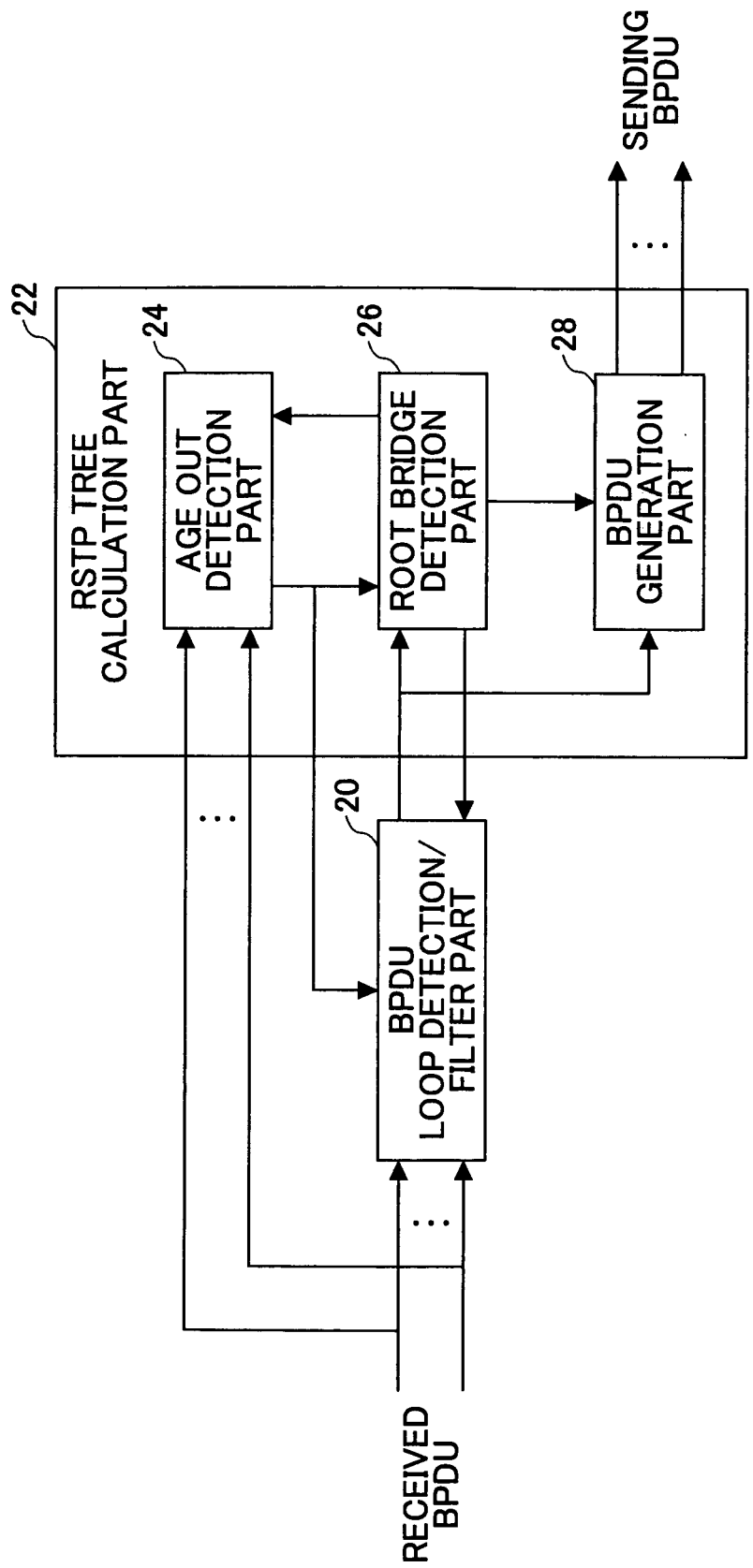
FIG. 9 is a functional block diagram of an embodiment of RSTP processes in a CPU.

FIG. 9 shows a functional block diagram of an embodiment of a RSTP process part in the CPU 14. In the figure, the BPDUs extracted by the input port circuits $12_1$~$12_m$ are provided to a BPDU loop detection/filter part 20 and to an age out detection part 24 in a RSTP tree calculation part 22.

The BPDU loop detection/filter part 20 holds a root bridge ID before aging out. After the BPDU loop detection/filter part 20 is notified of aging out from the age out detection part 24, the BPDU loop detection/filter part 20 performs BPDU loop detection process by comparing each root bridge ID in BPDUs provided from the input port circuits $12_1$~$12_m$ with the holding root bridge ID before aging out. If the BPDU loop is detected, the received BPDU is discarded. A BPDU by which the BPDU loop is not detected is provided to a root bridge determining part 26 and to a BPDU generation part 28 in the RSTP tree calculation part 22. All BPDUs provided before aging out are sent to the root bridge determination part 24 and to the BPDU generation part 28.

If the age out detection part 24 determines that a bridge priority of the received BPDU is smaller than a bridge priority of the root bridge held in the own bridge apparatus, the age out detection part 24 immediately detects aging out. If the age out detection part 24 determines that a bridge priority of the received BPDU is larger than a bridge priority of the root bridge held in the own bridge apparatus, the age out detection part 24 waits for a time period three times longer than the hello time. After that, the age out detection part 24 detects aging out, and provides a result of the aging out detection to each of the BPDU loop detection/filter part 20 and the root bridge determination part 26.

When the root bridge determination part 26 is notified of aging out by the age out detection part 24, the root bridge determination part 26 performs update of the root bridge. In the update of root bridge, the root bridge determination part 26 updates a current root bridge to a new root bridge that is indicated by a root bridge ID of the BPDU provided from the BPDU loop detection/filter part 20. Then, the root bridge determination part 26 recalculates a RSTP tree on the basis of the new root bridge. The root bridge determination part 26 sends a result of the calculation to the BPDU generation part 28. The BPDU generation part 28 generates a BPDU to be used for transmitting the calculation result to each bridge that is connected to the own bridge, and provides the BPDU to each of the output port circuits $18_1$~$18_n$ to which the bridges are connected.

Figure 10:
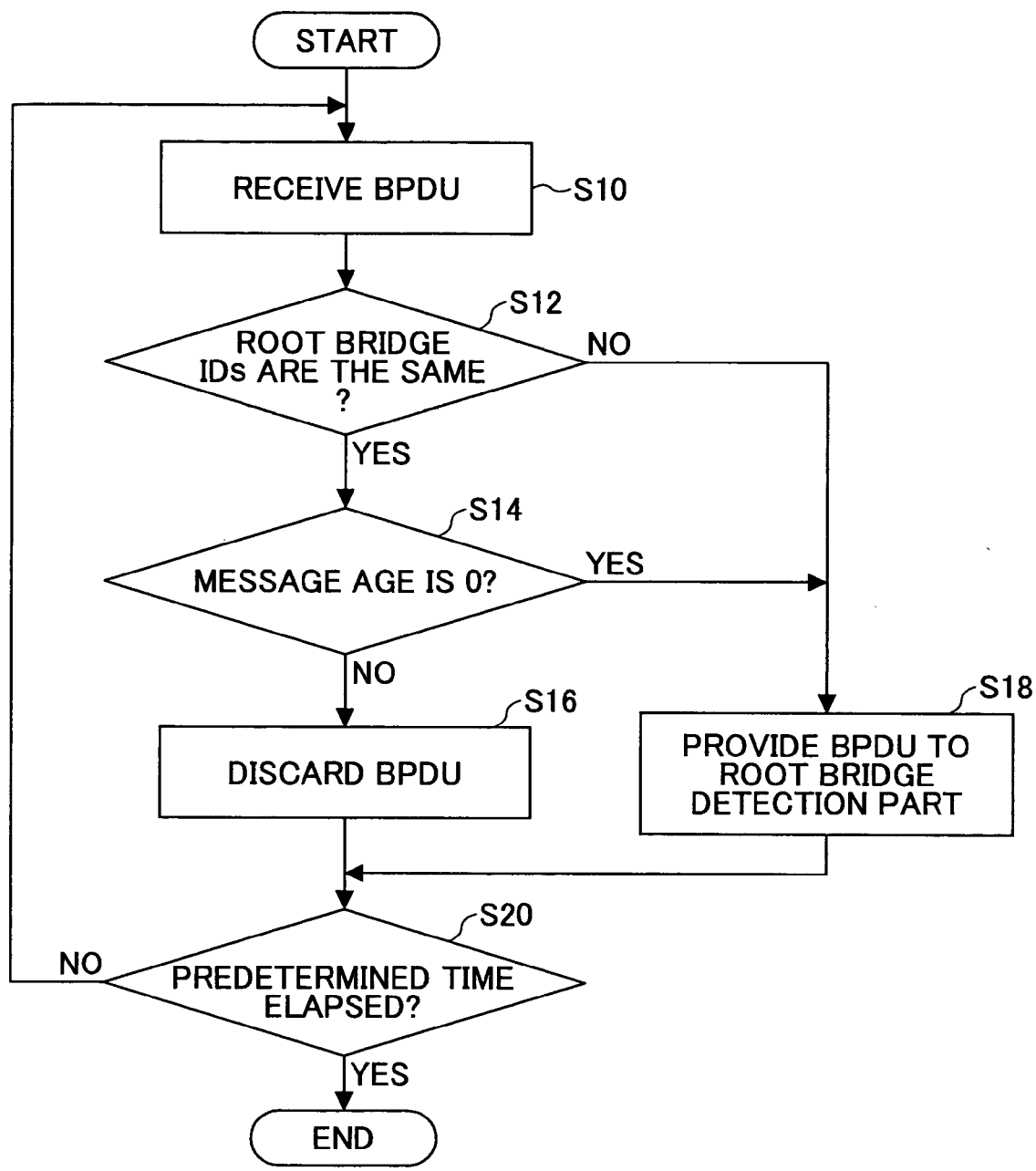
FIG. 10 is a flowchart showing a filter process performed by a BPDU loop detection/filter part 20 in a bridge connected to a former root bridge according to a first embodiment.

FIG. 10 shows a flowchart showing a filter process performed by the BPDU loop detection/filter part 20 in a bridge (for example, bridge #2, #3) connected to a former root bridge (bridge #1, for example) according to a first embodiment.

This procedure starts when the BPDU loop detection/filter part 20 is notified of aging out from the age out detection part 24.

In the figure, the BPDU loop detection/filter part 20 receives a BPDU provided from one of the input port circuits $12_1$~$12_m$ in step S10. Then, in step S12, the BPDU loop detection/filter part 20 determines whether a root bridge ID in the received BPDU is the same as a root bridge ID before aging out that is held by the own bridge in step S12.

If they are the same, the BPDU loop detection/filter part 20 determines whether the message age in the received BPDU is 0 in step S14. If the message age is not 0 so that it can be determined that a bridge other than the former root bridge transferred the BPDU, the BPDU loop detection/filter part 20 discards the BPDU since it is determined that a BPDU loop occurs in step S16.

On the other hand, if the root bridge IDs are different or if the message age is 0, since the BPDU loop does not occur, the BPDU loop detection/filter part 20 provides the BPDU to the root bridge determination part 26 in step S18.

After that, the BPDU loop detection/filter part 20 determines whether a predetermined time (several second to more than ten seconds, for example) has elapsed after the BPDU loop detection/filter part 20 is notified of aging out in step S20. If the predetermined time has not elapsed, the process goes to the step S10. When the predetermined time has elapsed, this process ends. The reason for setting the predetermined time is that the BPDU loop occurs only within the predetermined time right after the aging out occurs.

Figure 11:
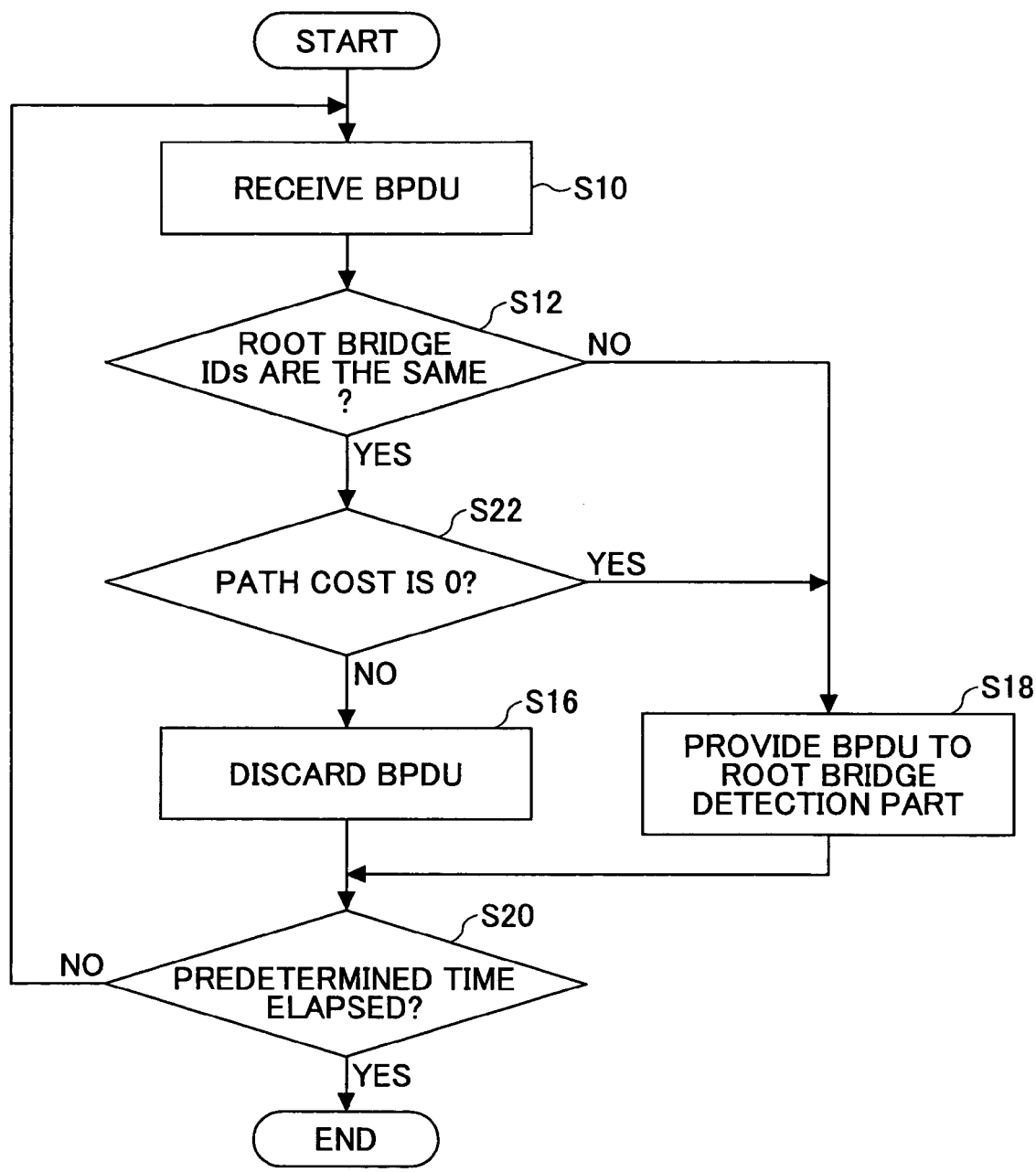
FIG. 11 is a flowchart showing a filter process performed by the BPDU loop detection/filter part 20 in the bridge connected to the former root bridge according to a second embodiment.

FIG. 11 is a flowchart showing a procedure of a filter process performed by the BPDU loop detection/filter part 20 in a bridge connected to the former root bridge according to a second embodiment. The difference between FIGS. 10 and 11 is as follows. It is determined whether the message age is 0 in step 14 in FIG. 10. On the other hand, it is determined whether a path cost is 0 in step S22 in FIG. 11. In FIG. 11, if the path cost is not 0, it is determined that the BPDU is transferred by a bridge other than the former root bridge so that it is determined that the BPDU loop occurs and the step goes to step S16. If the path cost is 0, it is determined that BPDU loop does not occur and the step goes to step S18.

The path cost is always 0 in a BPDU output from a root bridge, and a value is added to the path cost each time the BPDU is transferred by a bridge. Therefore, it can be determined whether the BPDU has passed through a bridge other than a root bridge. That is, if the path cost is not 0, it can be determined that the BPDU is one transferred from a bridge other than the root bridge.

Figure 12:
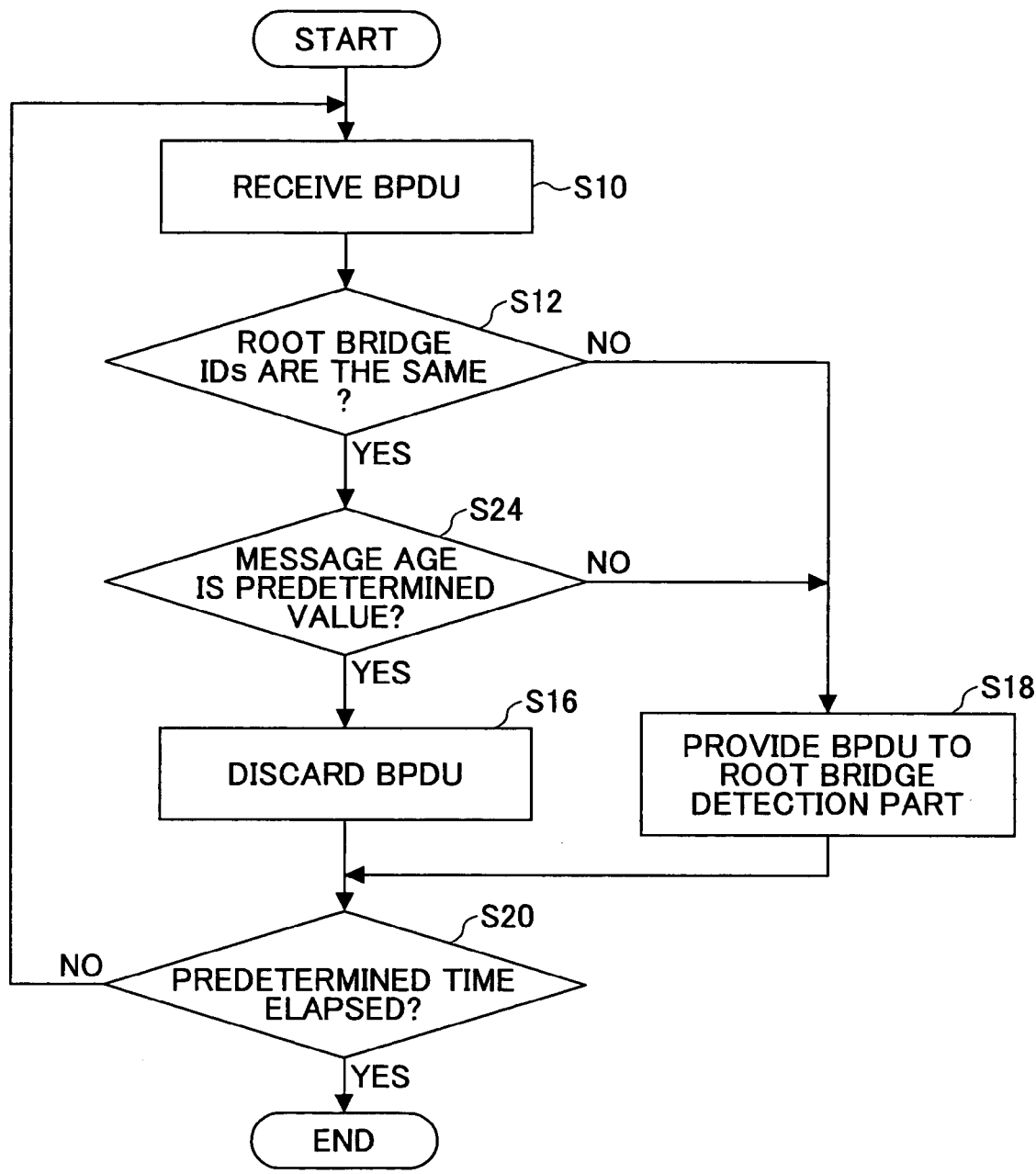
FIG. 12 is a flowchart showing a filter process performed by the BPDU loop detection/filter part 20 in the bridge connected to the former root bridge according to a third embodiment.

FIG. 12 is a flowchart showing a procedure of a filter process performed by the BPDU loop detection/filter part 20 in a bridge connected to the former root bridge according to a third embodiment. The difference between FIGS. 10 and 12 is as follows. It is determined whether the message age in the BPDU is 0 in step 14 in FIG. 10. On the other hand, in FIG. 12, it is determined whether the message age is a predetermined value in step S24. If the message age is the predetermined value, it is determined that a bridge other than the former root bridge transferred the BPDU in step S24, then, in step S16, it is determined that a BPDU loop occurs. If the message age is not the predetermined value, it is determined that the BPDU loop does not exist and the step moves to the step S18.

Figure 13:
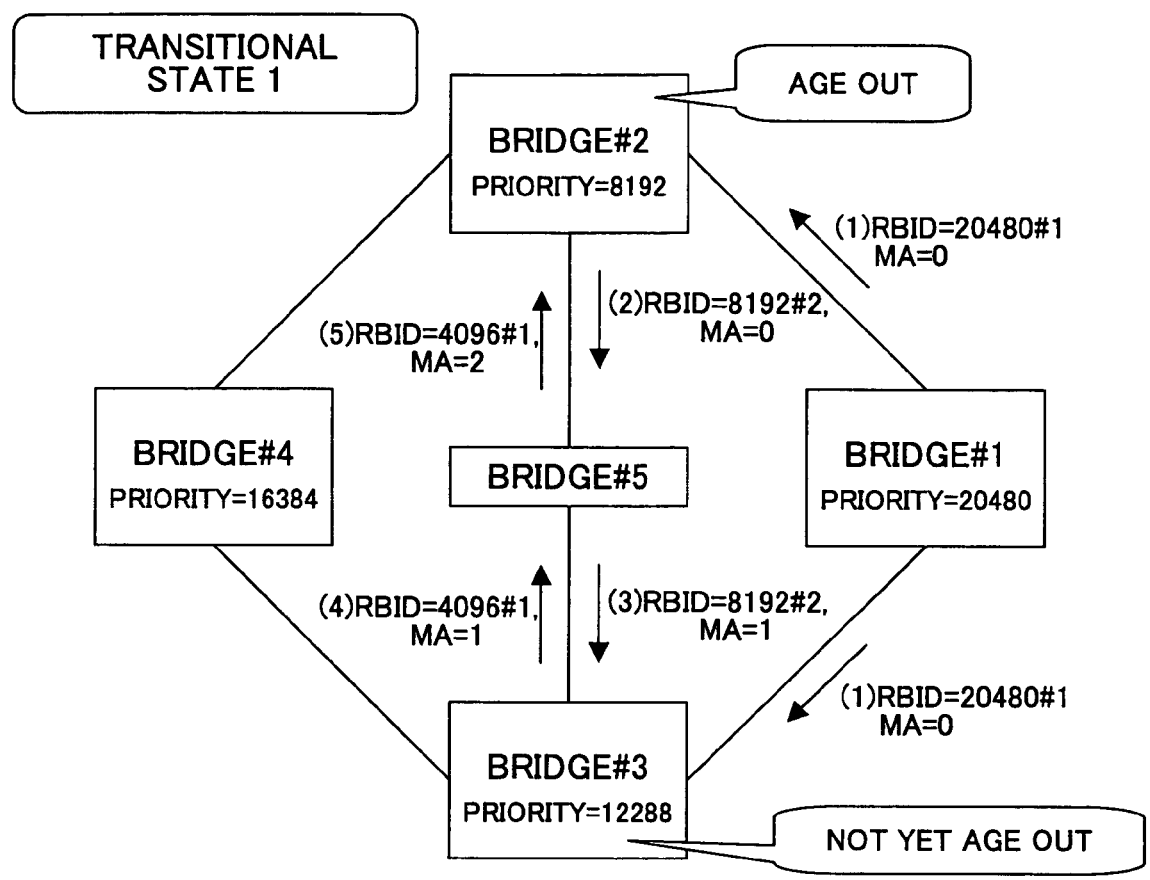
FIG. 13 shows change of network states when a topology change occurs according to the present invention.

In a network configuration shown in FIG. 6A, in a state of FIG. 6B, a message age in a BPDU transferred from the bridge #3 is 2 in the bridge #2 connected to the former root bridge #1. On the other hand, as shown in FIG. 13, in a network configuration in which a bridge #5 is inserted between the bridges #2 and #3, a message age in a BPDU transferred from the bridge #5 is 4 in the bridge #2 connected to the former root bridge #1. That is, if the network configuration is known, the value of the message age in a BPDU transferred from bridges other than the former root bridge #1 is predetermined. Therefore, if the message age in the BPDU is the predetermined value in step S24, it can be determined that the BPDU is one that is transferred from a bridge other than the former root bridge.

Like the message age, if the network configuration is known, the value of the path cost in a BPDU transferred from bridges other than the former root bridge #1 is predetermined. Therefore, it can be determined whether the path cost is a predetermined value in step S24 instead of the message age.

Further, in a network configuration shown in FIG. 6A, in the bridge #2 connected to the former root bridge #1, an input port that receives a BPDU transferred from the bridge #3 is predetermined. Thus, the BPDU loop detection/filter part 20 may determine whether an input port that receives a BPDU is an input port that is connected to a bridge other than the former root bridge. If the input port is connected to a bridge other than the former root bridge, the BPDU loop detection/filter part 20 can determine that BPDU loop occurs. If the input port is connected to the former root bridge, the BPDU loop detection/filter part 20 may determine that there is no BPDU loop and go to step S18.

Further, in step S14, for example, conditions may be combined in which the process goes to the step S18 if the message age is 0 and if the path cost is 0.

Figure 14:
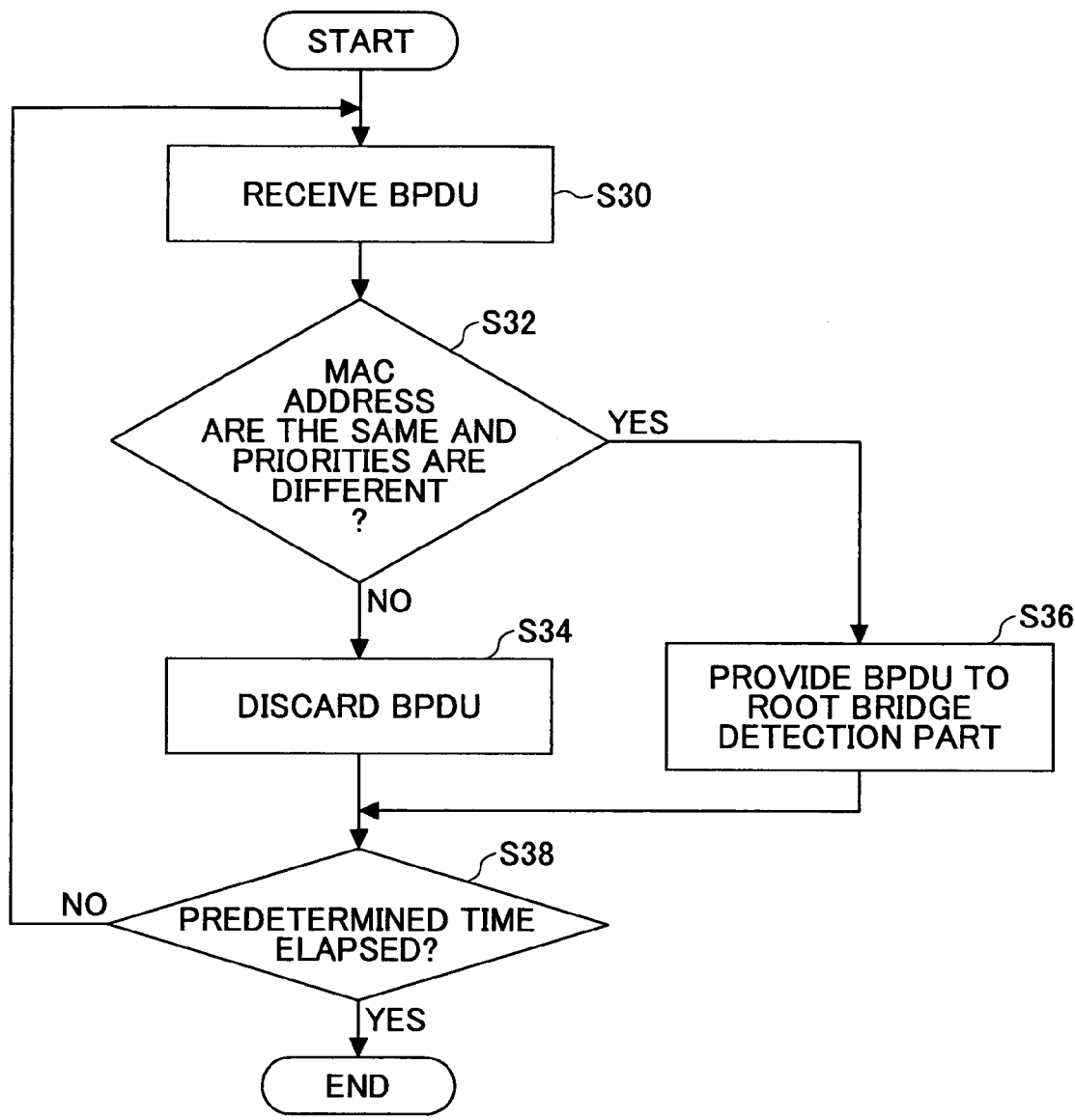
FIG. 14 is a flowchart showing a filter process performed by the BPDU loop detection/filter part 20 in the former root bridge according to a fourth embodiment.

FIG. 14 is a flowchart showing a procedure of a filter process performed by the BPDU loop detection/filter part 20 in a former root bridge (bridge #1, for example) according to a fourth embodiment. This procedure is started when a bridge priority of the bridge apparatus is changed.

In the figure, the BPDU loop detection/filter part 20 receives a BPDU provided from an input port circuit in step S30. Then, the BPDU loop detection/filter part 20 determines whether a MAC address in a root bridge ID in the received BPDU is the same as a MAC address of the own apparatus and determines whether a bridge priority in the root bridge ID is the same as the bridge priority of the own bridge.

If the MAC address in the root bridge ID in the received BPDU is the same as the MAC address of the own apparatus and if the bridge priority in the root bridge ID in the received BPDU is not the same as one of the own bridge, the BPDU loop detection/filter part 20 determines that a BPDU loop occurs and discards the BPDU.

In other cases, the BPDU loop detection/filter part 20 provides the BPDU to the root bridge determination part 26 in step S36 since the BPDU loop does not exist.

After that, it is determined whether a predetermined time (several seconds to more than ten seconds) has elapsed after the bridge priority of the own bridge is changed in step S38. If the predetermined time has not been elapsed, the process goes to step S30, and after the predetermined time elapses, the process ends.

Figure 15:
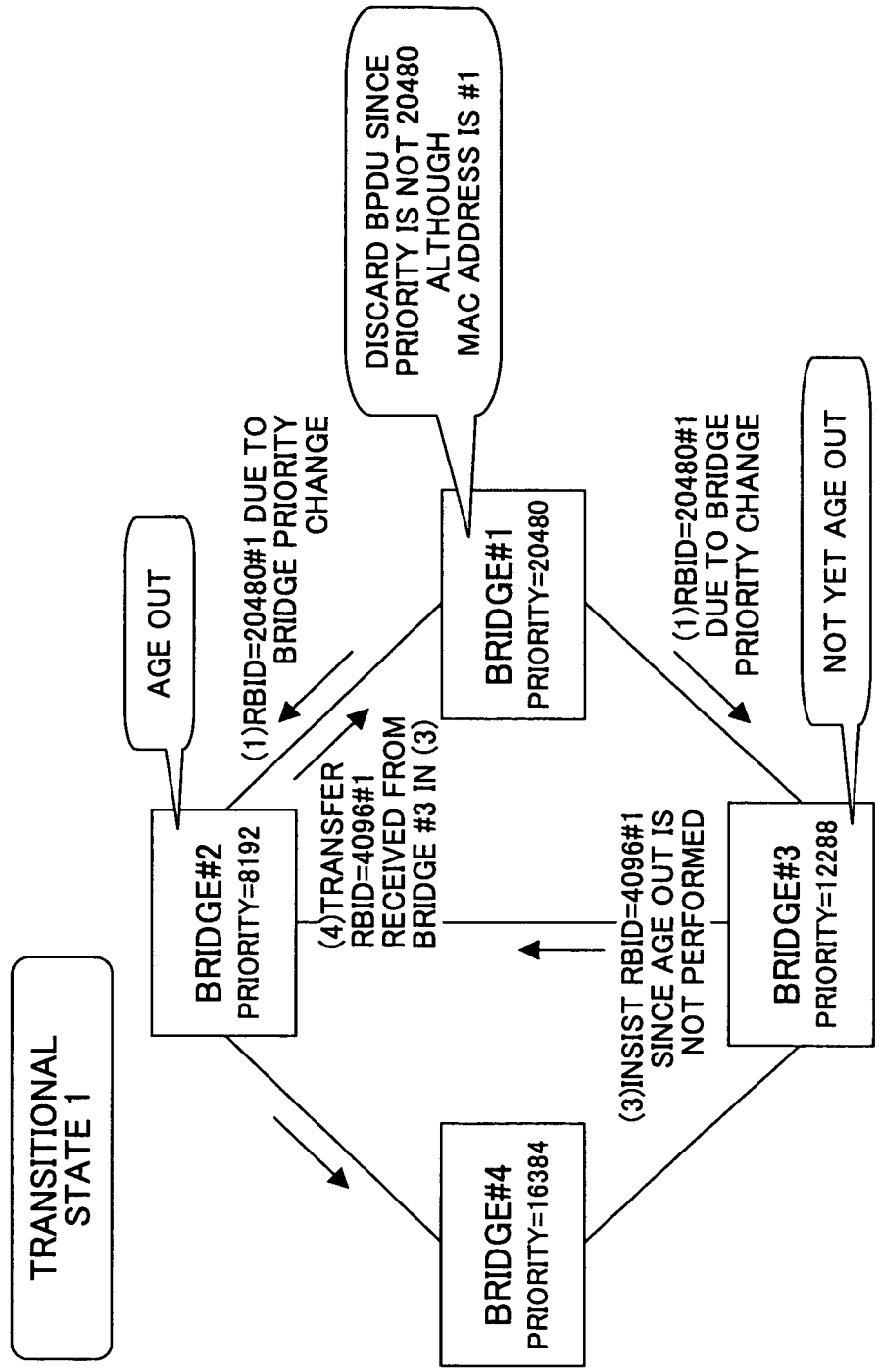
FIG. 15 shows change of network states when a topology change occurs according to the present invention.

If a bridge that was a root bridge until the topology was changed is included, as shown in FIG. 15, right after the bridge #2 ages out, the bridge #2 insists that the own bridge is the root bridge. However, since the bridge #3 has not aged out, the bridge #3 transfers the former bridge priority=4096 of the bridge #1 (3) to the bridge #2. Then, the birdie #2 transfers the former bridge priority=4096 to the bridge #1 (4). In the fourth embodiment shown in FIG. 14, the bridge #1 discards the BPDU transferred from the bridge #2 to prevent occurrence of a BPDU loop.

Figure 16:
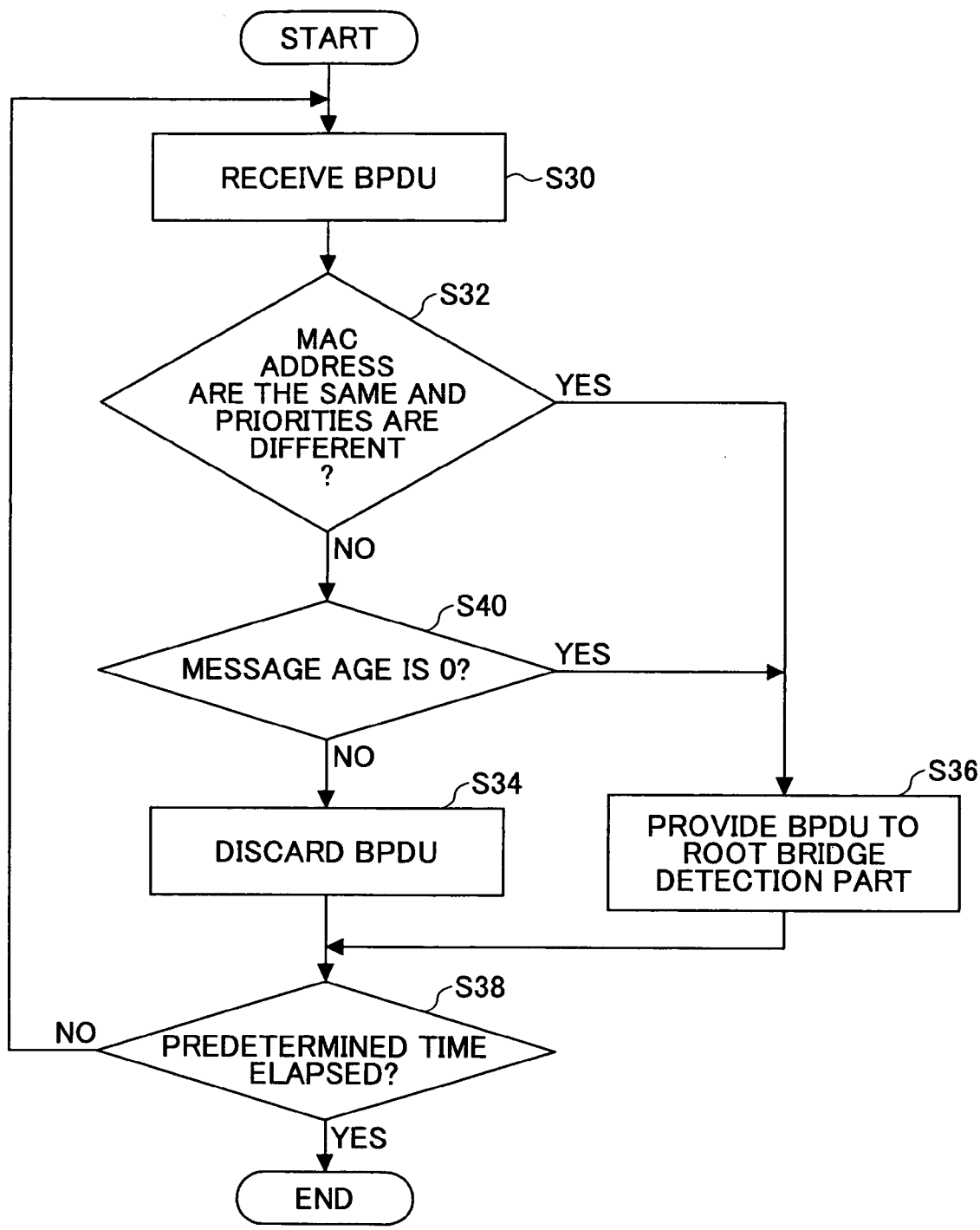
FIG. 16 is a flowchart showing a filter process performed by the BPDU loop detection/filter part 20 in the former root bridge according to a fifth embodiment.

FIG. 16 is a flowchart showing a procedure of a filter process performed by the BPDU loop detection/filter part 20 in a former root bridge (bridge #1, for example) according to a fifth embodiment.

In the case shown in FIG. 14, the process goes to step S36 if the condition of step S32 is satisfied. On the other hand, in this embodiment, if the condition of step S32 is satisfied, the BPDU loop detection/filter part 20 determines whether the message age in the BPDU is 0 in step S40. If the message age is not 0, the BPDU is provided to the root bridge determination part 26 in step S36. According to this embodiment, the BPDU loop can be detected more accurately.

Figure 17:
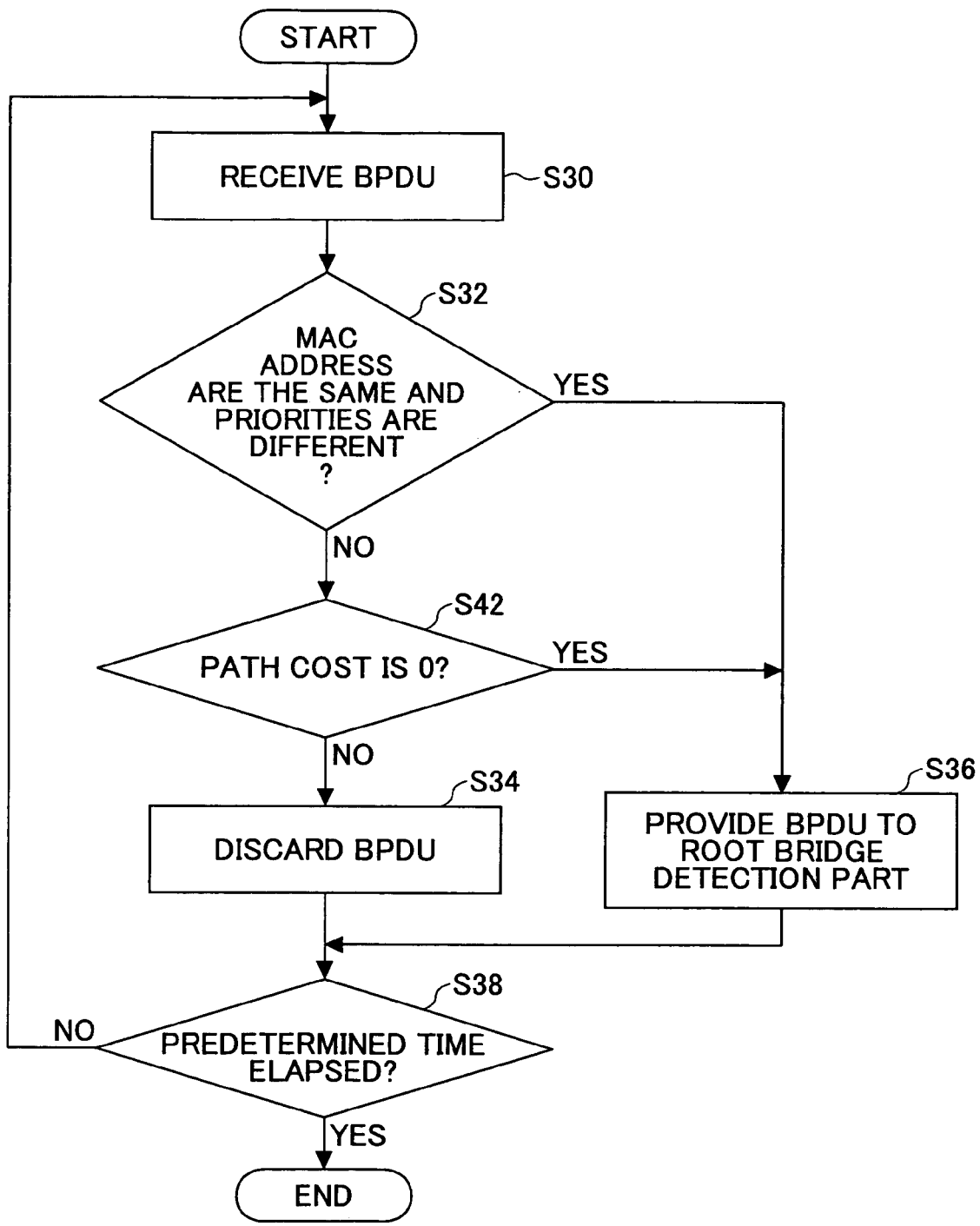
FIG. 17 is a flowchart showing a filter process performed by the BPDU loop detection/filter part 20 in the former root bridge according to a sixth embodiment.

FIG. 17 is a flowchart showing a procedure of a filter process performed by the BPDU loop detection/filter part 20 in a former root bridge (bridge #1, for example) according to a sixth embodiment.

As shown in FIG. 16, in the fifth embodiment, the BPDU loop detection/filter part 20 determines whether the message age in the BPDU is 0. On the other hand, in this embodiment, as shown in FIG. 17, the BPDU loop detection/filter part 20 determines whether the path cost is 0 in step S42. If the path cost is not 0, the BPDU loop detection/filter part 20 determines that a BPDU loop is occurring since a bridge other than the former root bridge transfers the BPDU. If the path cost is 0, the process goes to step S36 since the BPDU loop does not exist.

Figure 18:
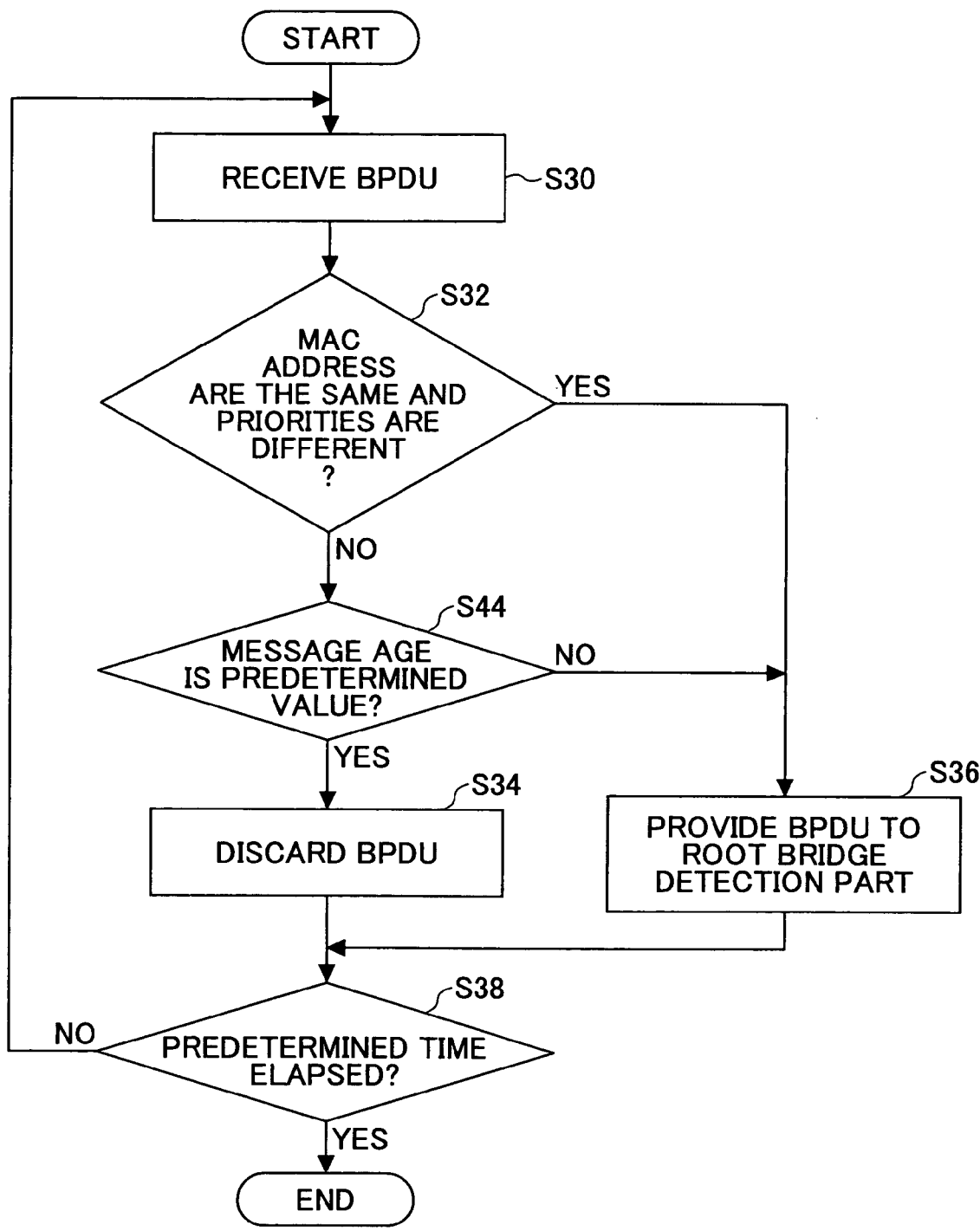
FIG. 18 is a flowchart showing a filter process performed by the BPDU loop detection/filter part 20 in the former root bridge according to a seventh embodiment.

FIG. 18 is a flowchart showing a procedure of a filter process performed by the BPDU loop detection/filter part 20 in a former root bridge (bridge #1, for example) according to a seventh embodiment.

As shown in FIG. 16, in the fifth embodiment, the BPDU loop detection/filter part 20 determines whether the message age in the BPDU is 0. On the other hand, as shown in FIG. 18 in this embodiment, the BPDU loop detection/filter part 20 determines whether the message age is a predetermined value in step S44. If the message age is the predetermined value, the BPDU loop detection/filter part 20 determines that a BPDU loop is occurring since a bridge other than the former root bridge transfers the BPDU. If the message age is not the predetermined value, the process goes to step S36 since the BPDU loop does not exist.

Like the case of the message age, since the path cost of the BPDU sent from a bridge other than the former root bridge #1 can be determined according to the network configuration, the BPDU loop detection/filter part 20 may determine whether the path cost is the predetermined value in step S44.

Further, in step S44, the conditions can be combined in which the process goes to step S36 if the message age is 0 and if the path cost is 0.

Although RSTP is taken an example in the above-mentioned embodiments, the present invention can be also applied to MSTP.

The present invention is not limited to the specifically disclosed embodiments, and variations and modifications may be made without departing from the scope of the present invention.

The present application contains subject matter related to Japanese patent application No. 2004-203674, filed in the JPO on Jul. 9, 2004, the entire contents of which are incorporated herein by reference.

What is claimed is:

1. A bridge apparatus comprising:

a port configured to transmit or receive packets; and a processor configured to detect packet looping of a control packet, the packet looping being caused by a topology change that is caused by a change of a parameter, the parameter being indicative of bridge priority of one or more bridges in a network, the control packet being a control packet of a rapid spanning tree protocol in a network which realizes node redundancy or circuit redundancy based on the rapid spanning tree protocol, and to discard, on a packet-by-packet basis, the control packet for which the packet looping is detected so as to prevent the discarded control packet from being transferred through an output port while other control packets are transferred through the output port, thereby preventing occurrence of the packet looping of the control packet, wherein, when a priority of the bridge apparatus that is a root bridge is changed, the processor detects the packet looping of the control packet on condition that a root bridge address included in the control packet is the same as an address of the bridge apparatus and that a root bridge priority included in the control packet is different from the changed priority of the bridge apparatus.

2. A bridge apparatus, comprising:

a port configured to transmit or receive packets; and a processor configured to detect packet looping of a control packet, the packet looping being caused by a topology change that is caused by a change of a parameter, the parameter being indicative of bridge priority of one or more bridges in a network, the control packet being a control packet of a multiple spanning tree protocol in a network which realizes node redundancy or circuit redundancy based on the multiple spanning tree protocol, and to discard, on a packet-by-packet basis, the control packet for which the packet looping is detected so as to prevent the discarded control packet from being transferred through an output port while other control packets are transferred through the output port, thereby preventing occurrence of the packet looping of the control packet, wherein, when a priority of the bridge apparatus that is a root bridge is changed, the processor detects the packet looping of the control packet on condition that a root bridge address included in the control packet is the same as an address of the bridge apparatus and that a root bridge priority included in the control packet is different from the changed priority of the bridge apparatus.

* * * * *